(12) United States Patent
Oh et al.

(10) Patent No.: US 9,237,376 B2
(45) Date of Patent: Jan. 12, 2016

(54) WIRELESS COMMUNICATION SYSTEM FOR GIGA BIT DATA RATE AND LOW POWER CONSUMPTION

(71) Applicant: Korea Advanced Institute of Science and Technology, Daejeon (KR)

(72) Inventors: InnYeal Oh, Daejeon (KR); ChulSoon Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/178,770

(22) Filed: Feb. 12, 2014

(65) Prior Publication Data
US 2015/0135239 A1 May 14, 2015

(30) Foreign Application Priority Data
Nov. 8, 2013 (KR) .......................... 10-2013-0135806

(51) Int. Cl.
*H04N 7/18* (2006.01)
*H04N 21/4363* (2011.01)
*H04N 21/41* (2011.01)
*H04B 7/06* (2006.01)
*H04B 10/114* (2013.01)
*H04B 10/40* (2013.01)
*H04B 10/112* (2013.01)
*H04B 7/08* (2006.01)
*H04B 7/04* (2006.01)
(Continued)

(52) U.S. Cl.
CPC ....... *H04N 21/43637* (2013.01); *H04B 7/0413* (2013.01); *H04B 7/0452* (2013.01); *H04B 7/06* (2013.01); *H04B 7/0695* (2013.01); *H04B 7/08* (2013.01); *H04B 7/088* (2013.01); *H04B 10/112* (2013.01); *H04B 10/114* (2013.01); *H04B 10/40* (2013.01); *H04B 10/50* (2013.01); *H04B 10/60* (2013.01); *H04N 7/20* (2013.01); *H04N 21/4126* (2013.01); *H04N 21/4363* (2013.01); *H04N 21/6131* (2013.01)

(58) Field of Classification Search
CPC .... H04B 7/0695; H04B 7/088; H04B 7/0617; H04B 5/0031; H04B 1/005; H04B 7/0413; H04B 7/0452; H04B 7/06; H04B 7/08; H04B 10/114; H04N 21/43637; H04N 21/4363; H04N 21/6131; H04N 7/20; H04N 21/4126
USPC ...................................... 725/81; 455/3.06, 73
See application file for complete search history.

(56) References Cited

U.S. PATENT DOCUMENTS

2004/0015990 A1* 1/2004 Suematsu et al. ................ 725/62
2008/0311857 A1* 12/2008 Naoe et al. ....................... 455/68
(Continued)

FOREIGN PATENT DOCUMENTS

KR 10-2010-0098668 A 9/2010
KR 10-2011-0096831 * 8/2011 ............. H04N 7/173
(Continued)

*Primary Examiner* — Hoang-Vu A Nguyen-Ba
(74) *Attorney, Agent, or Firm* — Rabin & Berdo, P.C.

(57) ABSTRACT

This invention is related to a wireless communication system for giga bit data rate and low power consumption, comprising a mobile communication terminal that transmits massive data to a display apparatus using a millimeter wave or terahertz wave band, a display apparatus that plays received massive data and a low speed wireless controller that controls the operation of the mobile communication terminal and the transmission of massive data from the mobile communication terminal into the display apparatus.

10 Claims, 6 Drawing Sheets

(51) Int. Cl.
*H04B 10/50* (2013.01)
*H04N 21/61* (2011.01)
*H04B 10/60* (2013.01)
*H04N 7/20* (2006.01)
*H04H 40/00* (2009.01)
*H04B 1/38* (2015.01)

(56) References Cited

U.S. PATENT DOCUMENTS

2009/0232240 A1* 9/2009 Lakkis .................... 375/260
2010/0297958 A1* 11/2010 Murakami et al. ............ 455/77
2011/0164878 A1* 7/2011 Ma et al. ..................... 398/79
2011/0273622 A1* 11/2011 Ngo et al. ................... 348/663

FOREIGN PATENT DOCUMENTS

| KR | 10-2012-0016872 A | 2/2012 |
| KR | 10-1106715 B1 | 2/2012 |
| KR | 10-2012-0058068 A | 6/2012 |
| KR | 10-1235831 B1 | 2/2013 |
| KR | 10-2013-0094177 A | 8/2013 |

* cited by examiner

WIRELESS COMMUNICATION SYSTEM FOR GIGA BIT DATA RATE AND LOW POWER CONSUMPTION

BACKGROUND OF THE INVENTION

1. Field of the Invention

The present invention relates to a wireless communication technology for giga bit data rate, and more particularly, a wireless communication system that transmits massive data from a mobile communication device to a HD (high definition) display apparatus using a low speed wireless controller wherein compression, amplification and coding of the data are not required.

2. Description of the Related Art

It becomes possible to display videos of massive data on a mobile communication terminal thanks to the advance in high data rate transmission technology. However, it is required to displays videos of massive data in real time without delay on a large HD display apparatus rather than the mobile communication terminal with small screen.

Zigbee, Bluetooth, UWB, and WiFi technologies are applicable to the mobile communication terminal. The Zigbee technology supports a transmission data rate of up to 250 kbps, the Bluetooth technologies supports a transmission data rate of up to 3 Mbps, the UWB technology supports a transmission data rate of up to 480 Mbps, and the WiFi technology supports a transmission data rate of up to 600 Mbps. It is difficult to transmit HD videos of giga bit in real time without compression even if the fastest WiFi wireless transmission technology is used.

FIG. 2 shows a conventional technology that transmits massive data form a smartphone or a tablet PC to a HD display apparatus. Each appliance has a built-in wireless module 8 or a wireless dongle 9 that supports USB interface. The wireless module or the wireless dongle is commercialized such as miracast, digital living network alliance (DLNA), all share cast or wireless display (WiDi) using 2 GHz or 5 GHz WiFi technology. However, these commercial products use compression technique to transmit videos of massive data due to the limitation of data transmission rate.

FIG. 3 shows a block diagram of a compression technique for transmitting massive data. Due to the limitation of transmission speed, the existing wireless transmission technology have to use the compression technique for transmitting massive data as illustrated in FIG. 3. Also, the existing wireless transmission technology use channel coding technique for correcting errors under non-line-of-sight (NLOS) conditions. However, there is the limitation in data transmission in real time due to the delay of several hundred milliseconds to several seconds during the transmission from the mobile communication terminal to the display apparatus. Therefore, the compression technique cannot be applied to a 3D game, a real time recognition system related to car accident and medical surgery. Thus, the wireless transmission technology that is able to transmit HD videos for giga bit data rate without compression and channel coding is required.

Moreover, the conventional compression and channel coding techniques of HD videos may not apply to the mobile communication terminal because of high power consumption and high price. Thus, the need for the compression-free wireless transmission technique has been raised.

As conventional technologies that implement wireless giga bit transmission without compression are the 5 GHz band multiple input multiple output (MIMO) technique as shown in FIG. 4 and the millimeter wave wideband transmission technique as shown in FIG. 5. The representative standard of MIMO technology is IEEE 802.11ac. The MIMO technology of the IEEE 802.11ac with 5 GHz has a diffraction characteristic so that it enables transmission under NLOS conditions. However, it requires a high-power amplifier wherein linearity is enhanced by 256 QAM modulation technique and it also has a drawback in power consumption due to its large size with multiple transceivers.

Even though the millimeter wave wideband transmission technique has not yet been applied to the mobile communication terminal, it can secure the wireless transmission technique for giga bit data rate only with a single channel by low-order modulation and also can operate in low power consumption. However, it can operate only under line-of-sight (LOS) conditions because the millimeter wave has straight characteristics. To overcome the drawback of the millimeter wave wideband transmission technique, beamforming technique that operates under NLOS condition has been developed, however, it has disadvantage in power consumption because it requires array antennas and each antenna requires a transceiver.

Currently millimeter wave or terahertz wave wireless technology supporting Gbps transmission for the mobile communication terminal has not been developed. Thus, new technology is required in order to apply wireless transmission of giga bit data rate to the mobile communication terminal Korean published patent No. 10-2011-0096831 discloses an IP-settop for playing media contents of an individual portable device on TV screen through wireless interwork. However, it has limitation of data transmission speed by using WiFi technology.

SUMMARY OF THE INVENTION

The present invention provides a wireless communication system for giga bit data rate and low power consumption that transmits massive data in real time from a mobile communication terminal to a HD display device without compression, amplification, and channel coding by controlling massive data transmission of the mobile communication terminal using a low speed wireless controller.

The wireless communication system for giga bit data rate and low power consumption in accordance with the present invention, comprises a mobile communication terminal that transmits massive data to a display device using millimeter waves or terahertz waves, the display device that plays received massive data and the low speed wireless controller that controls the operation of the mobile communication terminal and the massive data transmission from the mobile communication terminal to the display device.

DETAILED DESCRIPTION OF THE PREFERRED EMBODIMENTS

In accordance with the definition in the present invention, LOS is straight traveling environment wherein wireless communication for giga bit data rate is possible using millimeter wave or terahertz wave. NLOS is not straight traveling environment wherein millimeter wave or terahertz wave is not applicable.

Figure 1:
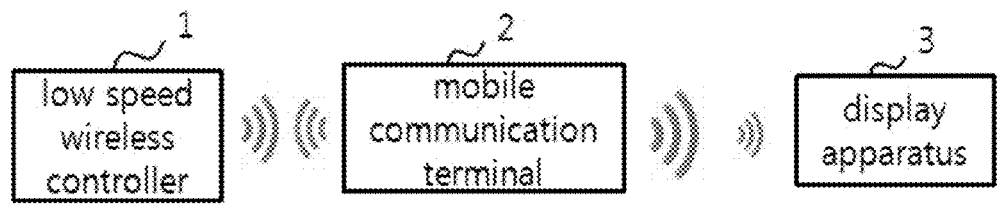
FIG. 1 illustrates the wireless communication system for giga bit data rate and low power consumption in accordance with the present invention.
Figure 2:
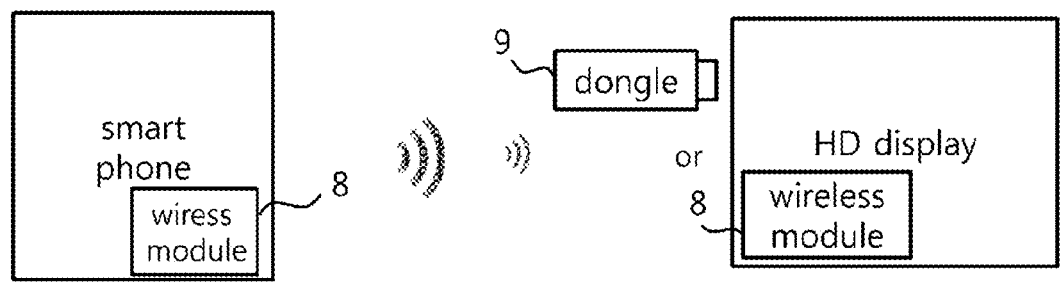
FIG. 2 is a schematic diagram of wireless transmission technology of massive data for a mobile communication terminal according to a conventional art.
Figure 3:
FIG. 3 is a block diagram of wireless transmission technology of a mobile communication terminal according to a conventional art.
Figure 4:
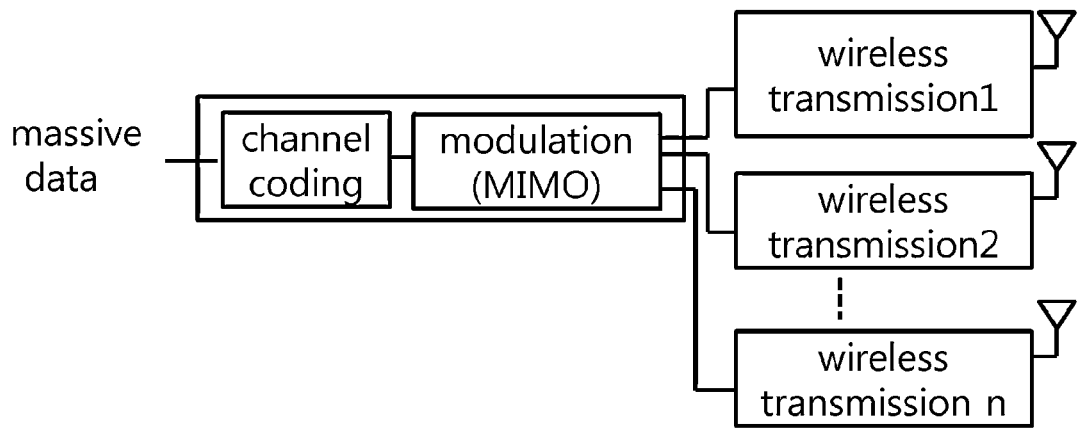
FIG. 4 is a block diagram of high-speed transmission technology of IEEE 802.11ac using 5 GHz frequency band according to a conventional art.
Figure 5:
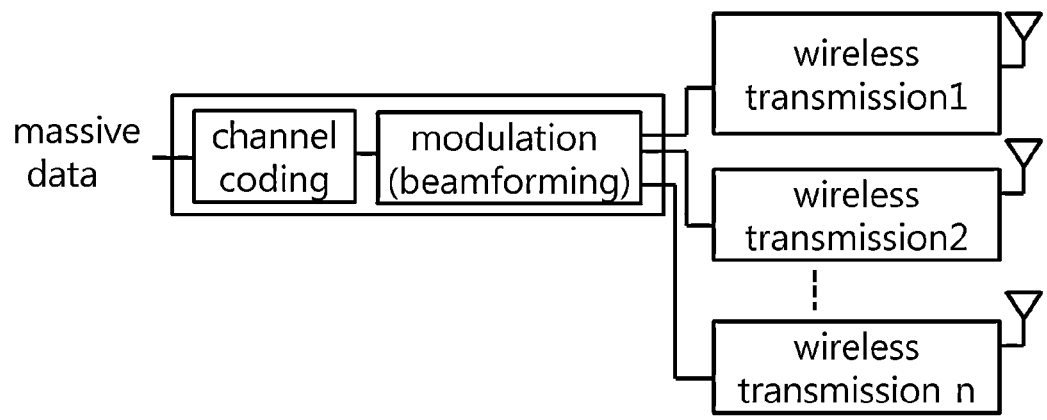
FIG. 5 is a block diagram of transmission technology of IEEE 802.11ac or IEEE 802.15.3c using 60 GHz frequency band according to a conventional art.

FIG. 1 illustrates the wireless communication system for giga bit data rate and low power consumption in accordance with the present invention.

Figure 7:
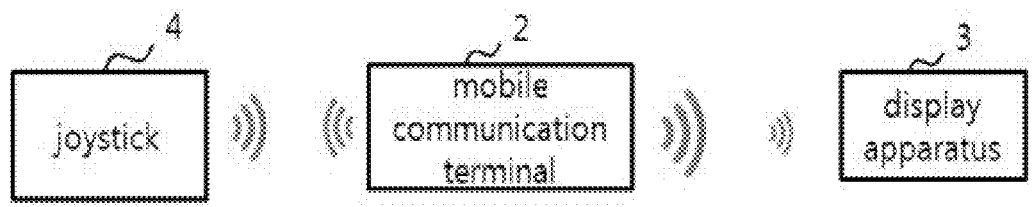
FIG. 7 illustrates a wireless communication system for giga bit data rate and low power consumption in accordance with the present invention.

A low speed wireless controller 1 controls the operation of a mobile communication terminal 2 and also controls massive data transmission from the mobile communication terminal 2 to a display apparatus 3. A user can control an application program of the mobile communication terminal using a keyboard of the low speed wireless controller 1 or a joystick 4 as illustrated in FIG. 7. The user generates key code input signals at the low speed wireless controller 1 and transmits them to the mobile communication terminal 2 while watching a screen on the mobile communication terminal at the same time. The information displayed on the screen of the mobile communication terminal 2 is HD video and is displayed in real time on the large screen of the display apparatus 3. The user can control the operation of the mobile communication terminal 2 with the low speed wireless controller 1 while watching HD display apparatus 3. The low speed wireless controller 1 transmits control signals to the mobile communication terminal 2. The low speed wireless controller 1 uses an existing low speed communication technology such as the Zigbee technology, the Bluetooth technology, the RFID technology or the infrared data association (IrDA) technology.

Figure 11A:
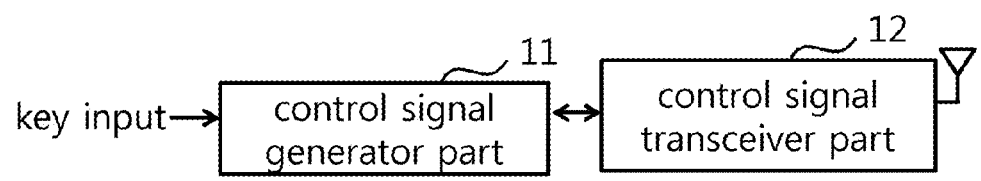
FIG. 11A is a block diagram of a low speed wireless controller comprising a control signal generator part and a control signal transceiver part.

Referring to FIG. 11A, the low speed wireless controller 1 comprises a control signal generator unit 11 that generates control signals for controlling the operation of the mobile communication terminal and generates a display control signal that controls the operation of the display apparatus 3; and a control signal transceiver unit 12 that transmits the control signals to the mobile communication terminal 2 using a low speed data communication technology such as the Zigbee technology, the Bluetooth technology, the RFID technology or the IrDA technology.

The mobile communication terminal 2 and the HD display apparatus 3 include a millimeter wave or terahertz wave communication module, respectively.

Figure 6:
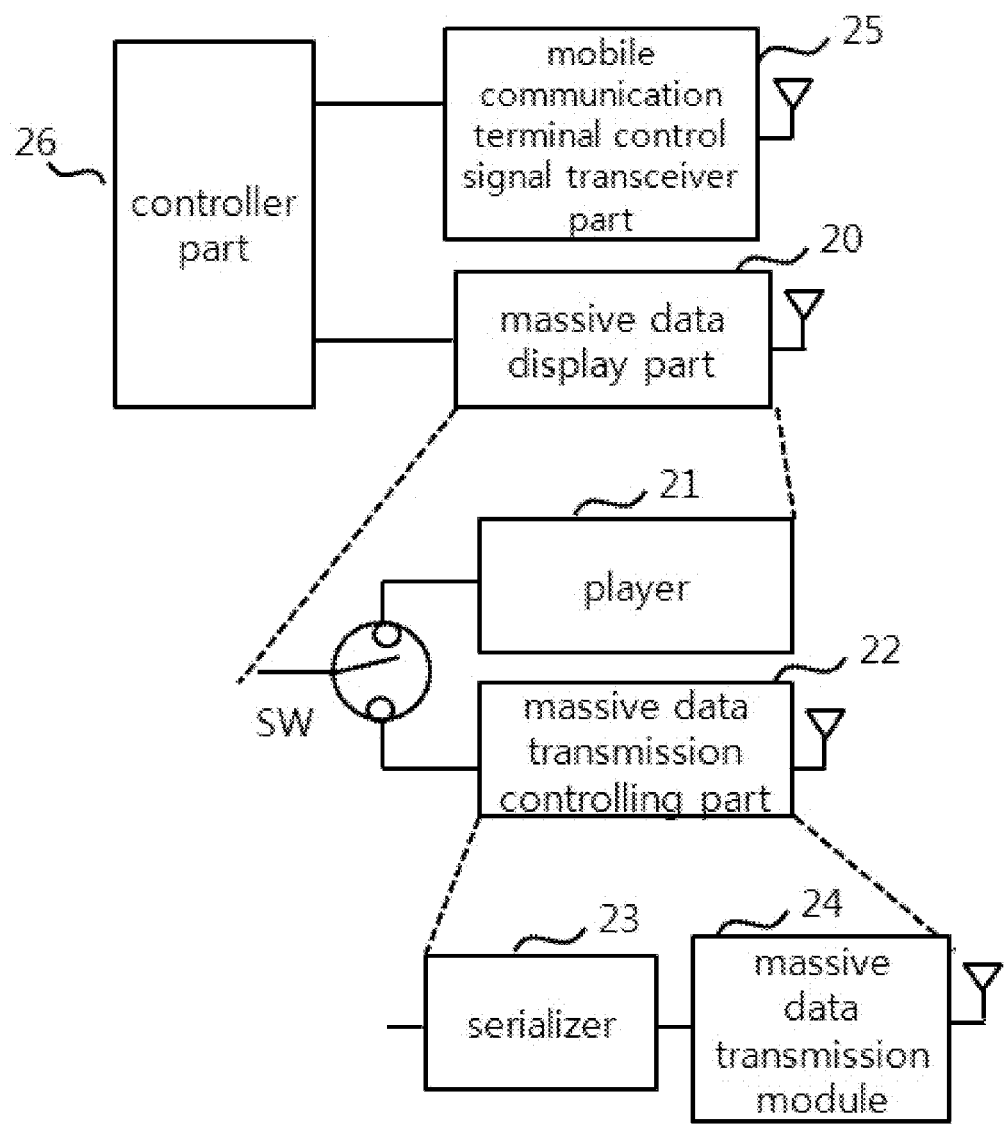
FIG. 6 is a block diagram of a display apparatus comprising a massive data transmission controlling unit and a control signal transceiver of a mobile communication terminal.

FIG. 6 is a detailed diagram of the mobile communication terminal 2 in accordance with an embodiment of the present invention, comprising a controller part 26, a control signal transceiver part 25 and a massive data display part 20. The massive data display part 20 comprises a switch (SW), a player 21 and a massive data transmission controlling part 22.

The massive data transmission controlling part 22 comprises a serializer 23 and a massive data transmission module 24. The control signal transceiver part 25 receives a mobile communication control signal from the low speed wireless controller 1. The massive data display part 20 operates selectively the player 21 and the massive data transmission controlling part 22. The massive data display part 20 controls the player 21 by receiving control signals from the controller part 26 or transmits the massive data to the display apparatus 3 through the massive data transmission module 24. The player 21 plays the massive data. The massive data transmission controlling part 22 controls the operation of the massive data transmission module 24 in responds to a mobile communication terminal control signal. The switch (SW) selectively turns on the player 21 and the massive data transmission controlling part 22. The serializer 23 converts massive data into serial signals. The massive data transmission module 24 transmits the output of the serializer 23 into the display apparatus 3 without compression. The massive data transmission module 24 can be embodied with millimeter wave communication module or terahertz wave communication module. In this way, the present invention can miniaturize the wireless communication system for giga bit data rate and low power consumption with embedded part without a function of compression.

In addition, an interface among high definition multimedia interface (HDMI), mobile high-definition link (MHL) or mobility display port (MyDP) can be included in the front part of the serializer.

The wireless transmission technology for giga bit data rate and low power consumption according to the present invention is hereinafter called as WiMi. The WiMi can display HD video data of the mobile communication terminal 2 on the screen of the display apparatus 3 in real time without compression. For instance, a means of the WiMi communication can be millimeter wave communication module or terahertz wave communication module for giga bit-per-second data rate without compression. The WiMi communication has an advantage in mobile communication because it need not to be equipped with a compression module so that it can decrease power consumption. In addition, the display apparatus and the mobile communication terminal in the present invention have low power consumption advantage in mobile communication terminal using a battery, because they do not require high power amplifier for amplifying a giga bit wireless transmission signal because they transmit and receive under LOS condition. For these reasons, the present invention can easily embody tangible high-speed transmission technology in portable appliance such as the mobile communication terminal 2.

This invention also enables wireless transmission of HD video data for giga bit data rate without delay using millimeter wave or terahertz wave because compression, amplification and channel coding for massive data transmission are not necessary. The mobile communication terminal 2 comprises a modulation module that modulates the massive data by using millimeter wave or terahertz wave as a carrier signal.

As illustrated in FIG. 7, the present invention embodies the low speed wireless controller 1 as a joystick 4. The low speed wireless controller 1 controlled by the joystick 4 transmits massive game images to the large display apparatus 3 at high speed in real time. And the low speed wireless controller 1 may be a joystick 4 that is equipped with the low speed wireless controlling module to transmit control signal for the operation of the mobile communication terminal 2.

Figure 8:
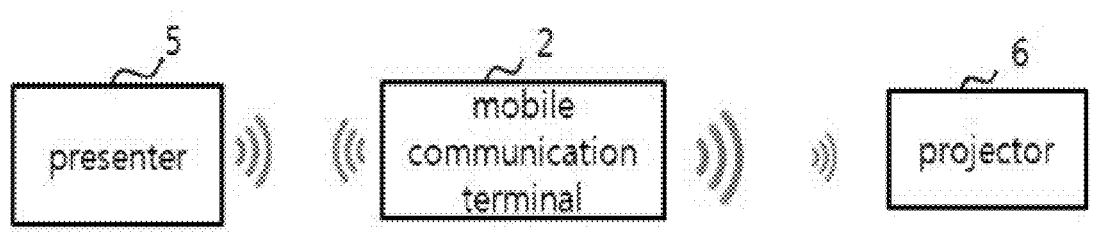
FIG. 8 illustrates a wireless communication system for giga bit data rate and low power consumption in accordance with the present invention.

As illustrated in FIG. 8, the present invention is able to easily display data saved in the mobile communication terminal 2 on the HD display apparatus 3 or project it on the screen by projector 6 in conference. The low speed wireless controller 1 may be a wireless presenter 5. The mobile communication terminal 2 controlled by the wireless presenter 5 can transmit massive data to the projector 6 using the WiMi technology. The low speed wireless controller 1 may be a wireless presenter 5 that is equipped with a low speed wireless controlling module to transmit a signal controlling the operation of the mobile communication terminal 2 and the display apparatus 3 comprises the large projector 6.

Figure 9:
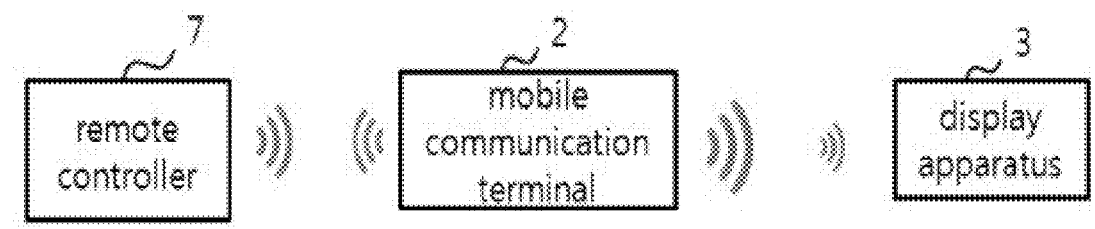
FIG. 9 illustrates a wireless communication system for giga bit data rate and low power consumption in accordance with the present invention.

As illustrated in FIG. 9, the present invention uses a remote controller 7 as a low speed wireless controller 1 and allows people watch pictures, videos or IPTV broadcasting on the large HD display apparatus 3, not through small screen of mobile communication terminal 2, by transmitting them on the large HD display apparatus 3.

Figure 10:
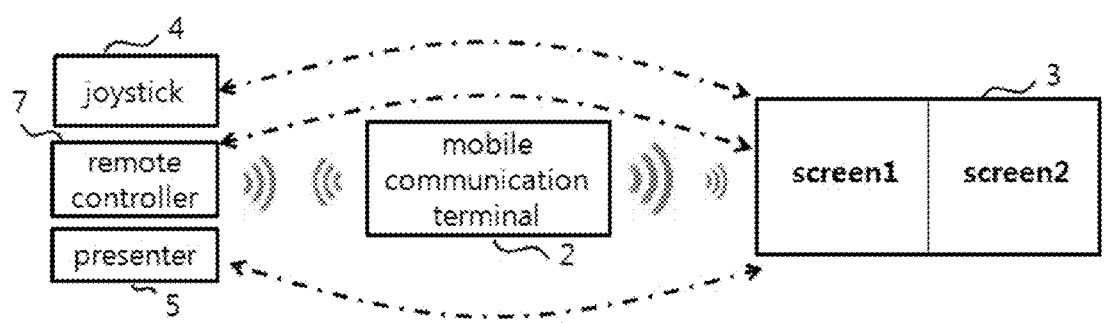
FIG. 10 illustrates a wireless communication system for giga bit data rate and low power consumption in accordance with the present invention.

FIG. 10 is a wireless communication system for giga bit data rate and low power consumption in accordance with a further embodiment of the present invention. The low speed wireless controller 1 comprises a low speed data wireless transmission function and an infrared transmission function that controls each of the mobile communication terminal 2 and the display apparatus 3. The joystick 4, the wireless presenter 5 or the remote controller 7 supports low speed wireless control function so that it can control the mobile communication terminal 2 and the display apparatus 3 at the same time. For example, the joystick 4, the wireless presenter 5 or the remote controller 7 can split the display screen into two parts and control one part to display massive information received from mobile communication terminal and another part to display TV channel contents provided from the display apparatus. In this way, the present invention can control each of the mobile communication terminal 2 and the display apparatus 3 to meet user's needs by additionally equipping the low speed wireless controller 1 that has both the low speed infrared transmission function and the low speed wireless transmission function.

Figure 11B:
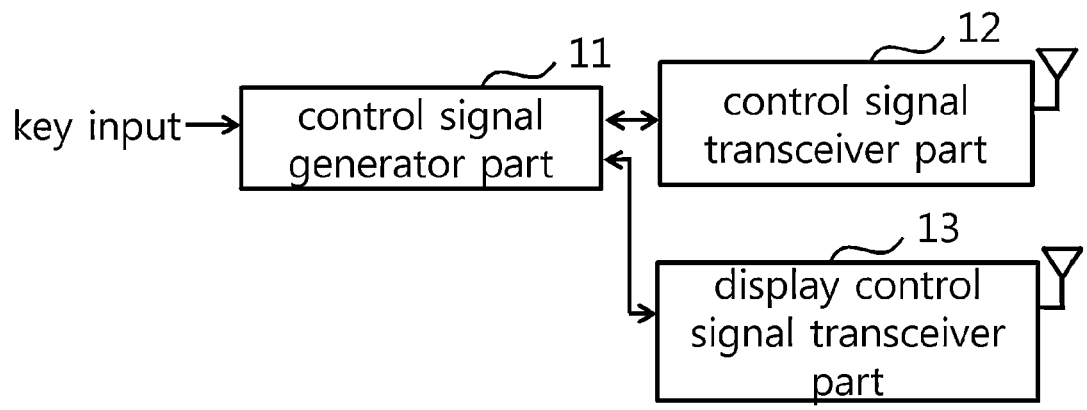
FIG. 11B is a block diagram of a low speed wireless controller comprising a control signal generator part, a control signal transceiver part, and a display control signal transceiver part.

Referring to FIG. 11B, the low speed wireless controller 1 comprises a control signal generator part 11 that generates control signals of the mobile communication terminal and the display apparatus 3, a control signal transceiver part 12 that transmits control signals of the mobile communication terminal to the mobile communication terminal using a low speed data communication such as the Zigbee, technology, the Bluetooth technology, the RFID technology or the IrDA technology, and a display control signal transceiver part 13 that operates infrared transmission of the display control signal to the display apparatus 3. The display control signal transceiver part 13 transmits a display control signal for controlling screen division and image selection using low speed data communication and also can control the mobile communication terminal 2 and the display apparatus 3 simultaneously.

Figure 12:
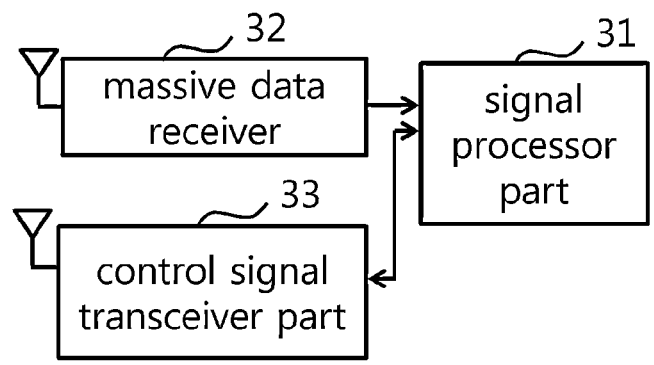
FIG. 12 illustrates a display apparatus to receive wireless data for giga bit data rate and low power consumption in accordance with the present invention.

Referring to FIG. 12, the display apparatus 3 comprises a massive data receiver 32 that receives the massive data from the mobile communication terminal 2, a display control signal transceiver part 33 that transceives the display control signal from the low speed wireless controller 1 and a signal processor part 31 that splits the screen on the display apparatus 3 with the display control signal and presents the massive data on more than one screen among divided screens.

When a millimeter wave communication module or a terahertz wave communication module is applied to the mobile communication terminal, it can transmit massive data in real time without compression. However, it is limited only under LOS condition because of straight traveling characteristics. However, the present invention enables the mobile communication terminal and the large display apparatus under LOS and NLOS conditions to transmit giga bit data by using the low speed wireless controller.

What is claimed is:

1. A wireless communication system for giga bit data rate and low power consumption comprises:
    a mobile communication terminal that transmits massive data to a display apparatus using millimeter wave or terahertz wave technology, the mobile communication terminal including
        a player playing the massive data,
        a serializer converting the massive data into a serial signal, and
        a massive data transmission module transmitting wirelessly an output of the serializer to the display apparatus using the millimeter wave or the terahertz wave technology;
    the display apparatus displaying the massive data received from the mobile communication terminal; and
    a low speed wireless controller that controls transmission of the massive data from the mobile communication terminal to the display apparatus.

2. The wireless communication system for giga bit data rate and low power consumption as claimed in claim 1, wherein the mobile communication terminal is located under LOS conditions from the display apparatus and the low speed wireless controller operates under NLOS conditions from the display apparatus.

3. The wireless communication system for giga bit data rate and low power consumption as claimed in claim 1, wherein the low speed wireless controller comprises:
    a control signal generator part that generates control signals for controlling the operation of the mobile communication terminal and the display apparatus;
    a control signal transceiver part that transmits the control signals to the mobile communication terminal using a low speed wireless channel; and
    a display control signal transceiver that transmits the control signals to the display apparatus.

4. The wireless communication system for giga bit data rate and low power consumption as claimed in claim 3, wherein the control signal transceiver part is a low speed wireless communication module that supports at least one technology selected from the group of technologies consisting of Zigbee technology, Bluetooth technology, RFID technology, and IrDA technology.

5. The wireless communication system for giga bit data rate and low power consumption as claimed in claim 3, wherein the display apparatus comprises;
    a massive data receiver part that receives the massive data;
    a display control signal transceiver part that receives the display control signal; and
    a signal processor part that splits a screen on the display apparatus in response to the display control signal and displays the massive data on more than one screen among divided screens.

6. The wireless communication system for giga bit data rate and low power consumption as claimed in claim 1, wherein the mobile communication terminal comprises a modulation module that modulates the massive data using a millimeter wave or a terahertz wave as a carrier signal.

7. The wireless communication system for giga bit data rate and low power consumption as claimed in claim 1, wherein the low speed wireless controller is a wireless presenter that is equipped with a low speed wireless controlling module to transmit a signal controlling the operation of the mobile communication terminal, and the display apparatus comprises a large projector.

8. The wireless communication system for giga bit data rate and low power consumption as claimed in claim 1, wherein the low speed wireless controller is a joystick that is equipped with a low speed wireless controlling module to transmit a control signal for the operation of the mobile communication terminal.

9. The wireless communication system for giga bit data rate and low power consumption as claimed in claim 1, wherein the mobile communication terminal and the display apparatus comprise a millimeter wave communication module or a terahertz wave communication module to transmit the massive data.

10. A low speed wireless controller that controls transmission of a millimeter wave or terahertz wave signal from a mobile communication terminal to a display apparatus and controls giga bit wireless data communication, the low speed wireless controller comprising:
   a control signal generator part that generates the mobile communication terminal control signal to control transmission of massive data of the mobile communication terminal;
   a control signal transceiver part that transmits the mobile communication terminal control signal using low speed data communication; and
   a display control signal transceiver part that transmits and receives a display control signal for controlling screen division and image selection of the display apparatus using the low speed data communication,
   wherein the low speed wireless controller controls the mobile communication terminal and the display apparatus simultaneously.

\* \* \* \* \*